F. KUHN & F. E. SHAILOR.
ELECTRICALLY HEATED SOLDERING IRON.
APPLICATION FILED AUG. 21, 1914.
1,154,414.
Patented Sept. 21, 1915.
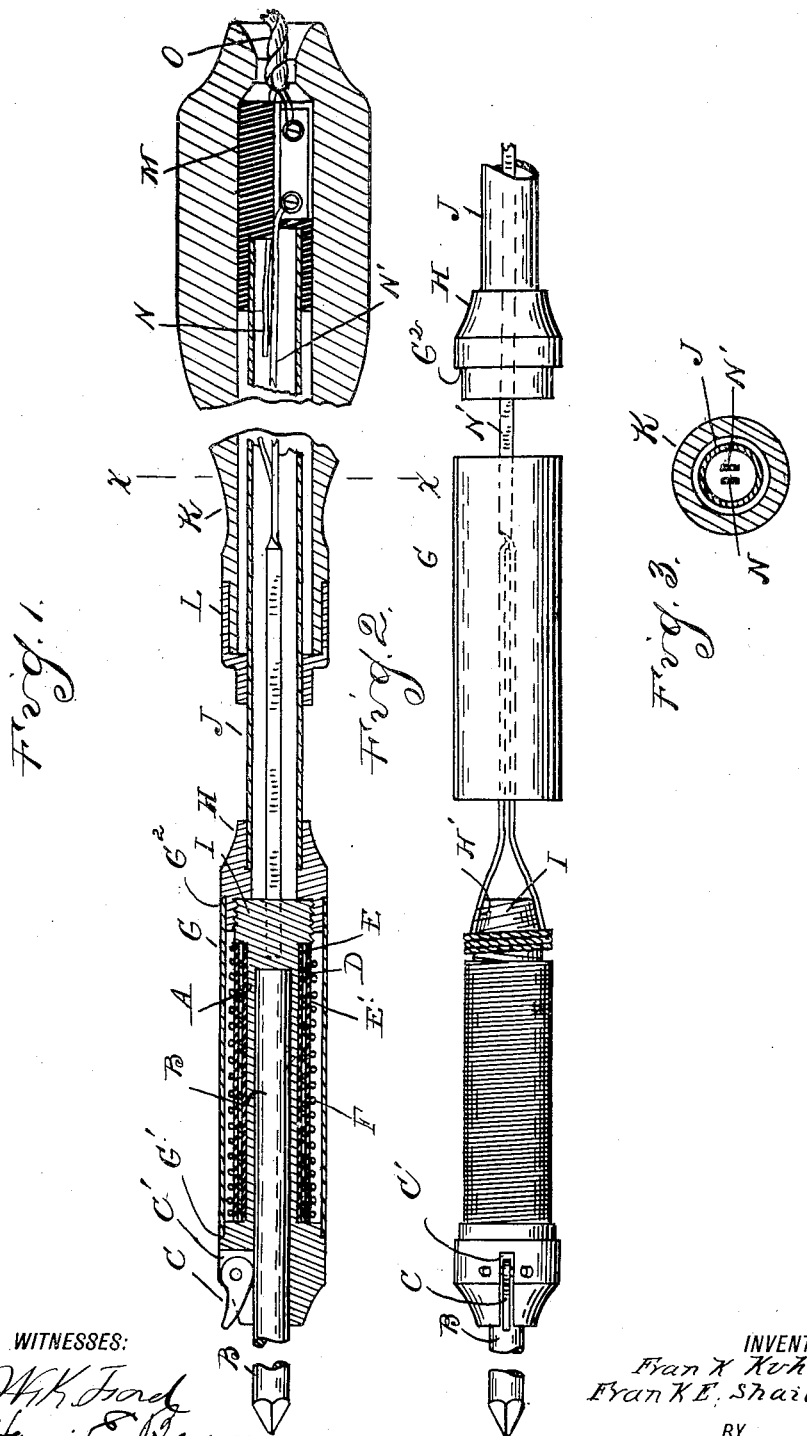
WITNESSES:
INVENTORS
Frank Kuhn &
Frank E. Shailor
BY
Whittemore Hulbert + Whittemore
ATTORNEYS

UNITED STATES PATENT OFFICE.

FRANK KUHN AND FRANK E. SHAILOR, OF DETROIT, MICHIGAN; SAID SHAILOR ASSIGNOR TO SAID KUHN.

ELECTRICALLY-HEATED SOLDERING-IRON.

1,154,414. Specification of Letters Patent. Patented Sept. 21, 1915.

Application filed August 21, 1914. Serial No. 857,845.

*To all whom it may concern:*

Be it known that we, FRANK KUHN and FRANK E. SHAILOR, citizens of the United States of America, residing at Detroit, in the county of Wayne and State of Michigan, have invented certain new and useful Improvements in Electrically-Heated Soldering-Irons, of which the following is a specification, reference being had therein to the accompanying drawings.

The invention relates to electrically heated soldering irons and comprises various features of construction as hereinafter set forth.

In the drawings, Figure 1 is a longitudinal section through the iron; Fig. 2 is an elevation showing some of the parts detached; and Fig. 3 is a cross section on line *x—x* Fig. 1.

A is a metallic spool, the bore of which is adapted to receive and closely fit the shank B of the soldering point projecting outward from the sleeve. This shank is preferably formed of copper and is detachably secured within the spool by a clamp C, preferably an eccentrically pivoted lever in a slot C' in the spool.

D is the resistor, preferably in the form of a ribbon tightly wound about the spool upon a layer of insulation, such as mica, E, and surrounded by a layer of insulation E'.

F is an armor for tightly clamping the insulation and resistor in heat-conducting contact with the spool, said armor being preferably formed of a winding of wire.

G is an outer tubular shell or case slightly separated from the armor F to prevent heat conduction therebetween, and having a shouldered seat G' upon the outer end of the spool. At the inner end of the spool is a detachable head H, which has a threaded engagement with the end I of the spool, and is shouldered at G² for engagement with the sleeve G.

J is a tube connected with the head H and extending therefrom to form a shank for connection with the handle K. This handle is preferably formed of wood and has a bore which is larger than the diameter of the shank J, so as to form an air space therebetween for heat insulation. The inner end of the handle engages a collar L sleeved upon the shank J and at the outer end of the handle within the bore is an insulator bushing M recessed to engage the end of the shank J. The electric terminal contacts N and N' pass through apertures formed by cutting away the head H at H' on opposite sides thereof and into the tubular shank J, through which they extend to the bushing M and are there connected to the flexible conductor O passing outward through the end of the handle.

With the construction as described, when current is passed through the resistor the heat is directly conducted into the spool A and from the latter into the closely fitting shank of the soldering point B. The latter being formed of good heat-conducting material such as copper, will absorb the heat and convey it outward, the exposed portion, or the portion extending out from the spool, being of sufficient length to provide a sufficiently large heat dissipating surface which will prevent overheating of the tool. Thus the danger of a burn-out in the resistor is avoided as the temperature can never mount to the danger point by reason of the conduction away of the heat through the shank B.

The heat which is conducted into the tubular shank J will not be directly communicated to the handle K on account of the air space insulation, and the arrangement of the collar L and insulator bushing M at opposite ends of the handle insures a good mechanical connection between the same and the shank.

What we claim as our invention is:—

1. The combination with a hollow spool member, of a resistor wound thereupon and insulated therefrom, and a tool of the same cross-section throughout substantially its entire length, having a shank portion fitting within said hollow spool in heat-conducting contact therewith, and provided with a projecting portion having a heat-dissipating surface for preventing overheating of the resistor.

2. The combination of a hollow spool member having an integral head at one end thereof, a detachable head having a threaded engagement with the opposite end of said spool, said head having a cut-away portion, a hollow shank connected to said detachable head, a resistor wound upon said spool and insulated therefrom, terminal conductors for said resistor projecting outward through said cut-away portion of the head and said hollow shank, an armor surrounding said resistor upon said spool, and a tool having a shank extending into said spool in heat-conducting contact therewith.

3. The combination with a hollow spool, of a resistor wound thereupon and insulated therefrom, a hollow shank extending from said spool, terminals for said resistor extending through said hollow shank, a hollow handle mounted upon said shank and spaced therefrom for a substantial distance to form heat insulation, and a tool having a shank portion engaging said hollow spool and an outwardly projecting portion forming a heat-dissipating surface.

4. In an electrically heated tool, the combination with the heating unit, of a hollow shank projecting therefrom, terminals for said unit extending outward through said shank, a hollow handle surrounding said shank and spaced therefrom, and mountings upon opposite ends of said handle for securing the same to said shank, the terminals extending to the mounting upon the outer end of said handle.

5. In an electrically heated tool, the combination with the heating element, of a hollow shank projecting therefrom, terminals for the heater extending through said hollow shank, a hollow handle surrounding said shank and spaced therefrom, a collar at the inner end of said handle forming a mounting on said shank, an insulator block within said handle for engaging the outer end of said shank, and terminal contacts mounted upon said insulator block for connecting the terminals of the heating element with the external conductor.

6. The combination of a hollow spool having an integral head at one end and a threaded head at the opposite end partly cut away, a resistor wound upon said spool and insulated therefrom having terminals passing through said cut away portion of the threaded head, a detachable head engaging said threaded head, a hollow shank connected to said detachable head, a handle mounted upon said hollow shank, connections within said handle between the terminals of the resistor and the external conductor, and a tool having a shank detachably engaging said hollow spool.

7. In an electrically heated tool, the combination with the heating element of a hollow shank projecting therefrom and forming a conduit for the terminals of said heating element, a hollow handle mounted on said shank and spaced therefrom, an insulator terminal block fitting within said hollow handle forming a bushing for securing said hollow shank, and a mounting for the connection between said terminals and the external circuit.

8. The combination of a hollow spool member having an integral head at one end thereof, a detachable head having a threaded engagement with the opposite end of said spool, a resistor wound upon said spool member and insulated therefrom, a sleeve supported by and extending between said integral head and detachable head, and a tool having a shank portion slidably fitting within said hollow spool.

In testimony whereof we affix our signatures in presence of two witnesses.
FRANK KUHN.
FRANK E. SHAILOR.

Witnesses:
CHARLES GOULD,
ROLAND DRESSEL.